(12) United States Patent
Corghi (10) Patent No.: US 7,128,119 B2
(45) Date of Patent: Oct. 31, 2006

(54) AUTOMATIC DEVICE FOR MOUNTING AND DISMOUNTING TIRES

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 13 days.

(21) Appl. No.: 11/115,254

(22) Filed: Apr. 27, 2005

(65) Prior Publication Data

US 2005/0247409 A1   Nov. 10, 2005

(30) Foreign Application Priority Data

May 6, 2004  (IT) ........................... RE2004A0049

(51) Int. Cl.
*B60C 25/128* (2006.01)
(52) U.S. Cl. .................... 157/1.22; 157/1.24
(58) Field of Classification Search .............. 157/1.22, 157/1.24, 1.28
See application file for complete search history.

(56) References Cited

U.S. PATENT DOCUMENTS 7,048,026 B1 * 5/2006 Bonacini ................. 157/1.28

FOREIGN PATENT DOCUMENTS

EP      1177920 B1    10/2004

* cited by examiner

*Primary Examiner*—David B. Thomas
(74) *Attorney, Agent, or Firm*—Browdy and Neimark, PLLC (57) ABSTRACT

An automatic device (1) for mounting and dismounting a tire (100) onto/from the rim (201) of a wheel (120) associated with a tire-dismounting machine (100) comprising a lower base (101) on which are associated rotating support and locking means (102) of the rim (201) of a wheel, a pole (103) extending vertically associated with said base (101), a horizontal support arm (104) associated with said pole (103), said device comprising a mobile shaft (2b) that can slide vertically inside a pipe (2) supported so that it can slide horizontally on said arm (104), an articulated quadrilateral made up of a tire-dismounting tool (4), a pair of opposite connecting rods (13, 14) and a body (6) fixed to the lower end of the mobile shaft (2b), and a manoeuvring lever (7) articulated with said quadrilateral and suitable for deforming it to transmit the roto-translating motion to the tool (4) that goes from a seeking configuration to an extraction configuration of the bead (202') from the rim (201).

10 Claims, 7 Drawing Sheets

AUTOMATIC DEVICE FOR MOUNTING AND DISMOUNTING TIRES

The present invention refers to an automatic device for mounting and dismounting tires in accordance with the preamble of claim 1.

More specifically, the present invention refers to an automatic device for mounting and dismounting tires installed on tire-dismounting machines, which allow the tire to be mounted and or dismounted on a rim of a wheel for automobiles.

As known, to remove tires from the respective rims as well as to carry out the reverse operation, machines are used that comprise a rotating platform with a vertical axis equipped with a self-centring device for locking the rim, this rim having a support positioned over it that supports a tire-dismounting tool, which can be adjusted both in height and in the horizontal direction, suitable for cooperating with the edge, or bead, of the tire to push it below the edge of the rim and then withdraw it. In the machines of the prior art, said tool is arranged at the end of a vertical support stem that slides in an end seat of a horizontal arm with respect to which it can be locked in level.

The horizontal arm is in turn free to slide in the end seat of a vertical post that rises from the base of the machine at the side of the platform that receives the tire.

Such an arm is equipped with means suitable for locking the tire-dismounting tool in the desired position.

The dismounting operation of a tire from the rim foresees the prior detachment of the bead of the tire from the bead-locking edge of the rim by means of a suitable device called a bead breaker, which can be separate from the tire-dismounting machine.

Once the bead has been detached, the wheel complete with rim and tire is arranged on the self-centring device and locked.

The dismounting tool is moved closer to the edge of the rim where it is inserted under the bead of the tire and lifts it above the edge of the rim itself.

The rotation o the platform and therefore of the wheel locked to it allow the tire to be dismounted.

This dismounting operation requires the active intervention of a trained operator.

According to a solution known in the field and described in EP-A-1177920 to the same Applicant, the dismounting tool is associated with an operating head that is positionable in level and horizontally translatable, which can take up a first configuration for seeking and gripping the bead of the tire, and a second configuration for extracting the bead of the tire from the rim. Moreover, the support means on which the rim is locked translate in a direction perpendicular to the axis to position the edge of the rim in the operating range of the tool.

This solution, whilst working very well, does have some drawbacks and disadvantages, both from the point of view of the constructive difficulty of the device itself and from the point of view of the versatility of operation. Indeed, in order to be able to operate with wheels of any diameter the support means of the rim must be translated. Therefore, there is a strong requirement to have an automatic device for mounting and dismounting tires that operates without the help of translation means associated with the means for supporting and locking the wheel during the mounting/dismounting operations.

Subordinately, the device must work automatically, be simple and quick to use even for a user without particular expertise, have little constructive difficulty and be able to be used with tire-dismounting machines of the prior art.

The purpose of the present invention is that of providing an automatic device for mounting and dismounting tires having structural and functional characteristics such as to satisfy the aforementioned requirements and at the same time to avoid the aforementioned drawbacks with reference to the prior art, in the context of a simple and rational constructive solution.

Such a purpose is accomplished through an automatic device for mounting and dismounting tires in accordance with claim 1.

The dependent claims outline preferred and particularly advantageous embodiments of the automatic device for mounting and dismounting tires according to the invention.

Further characteristics and advantages of the invention shall become clear from reading the following description provided as an example and not for limiting purposes, with the help of the figures illustrated in the attached tables, in which.

With reference to the aforementioned figures, an automatic device for mounting and dismounting tires in accordance with the present invention is globally indicated with 1.

Said device can be associated with a tire-dismounting machine 100.

Said machines 100 are of the conventional type and therefore shall not be described with particular detail hereafter.

Figure 1:
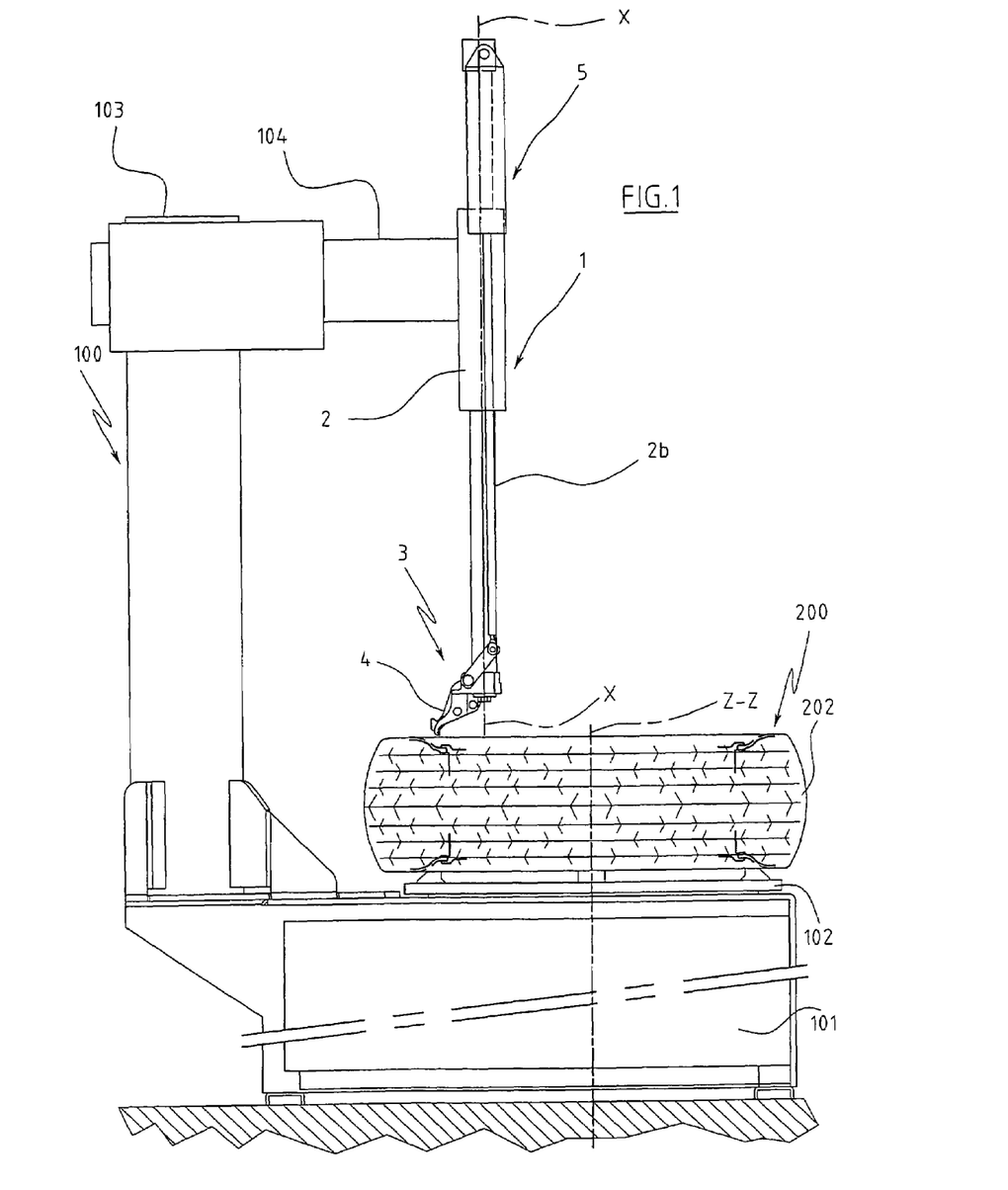
FIG. 1 shows a side view of an automatic device for mounting and dismounting tires in accordance with the present invention, installed on a tire-dismounting machine.

The machine 100 briefly comprises a lower base 101 on which are associated support and locking means 102 of the rim 201 of a wheel 200 with tire 202.

The support and locking means 102 are suitable for rotating about a vertical rotation axis Z—Z through the actuation of suitable motor means, generally arranged inside the lower base 101, per se known and not illustrated.

A vertical post 103, integrally associated with the edge of the base 101, rises from the base 101.

A support arm 104, extending horizontally and locked at the upper end, is associated with said post 103.

Said arm 104 is free to slide horizontally.

The device 1 of the present invention is associated with said support arm 104 at the end that is distal from the post 103.

The device 1 comprises a pipe extending vertically along an axis X—X substantially parallel to the rotation axis Z—Z and associated with the support arm 104.

Inside said pipe a mobile shaft 2b is slidably inserted between a position away from the rim and a position close to the rim 201, when the latter is fixed to the support and locking means 102.

In the example, the mobile shaft 2b is prism-shaped suitable for preventing it from rotating about the axis X—X.

The mobile shaft 2b is commanded by means not illustrated in the figures.

An articulated system 3 comprising a dismounting tool 4 is associated with the lower free end of the mobile shaft 2b.

Figure 3:
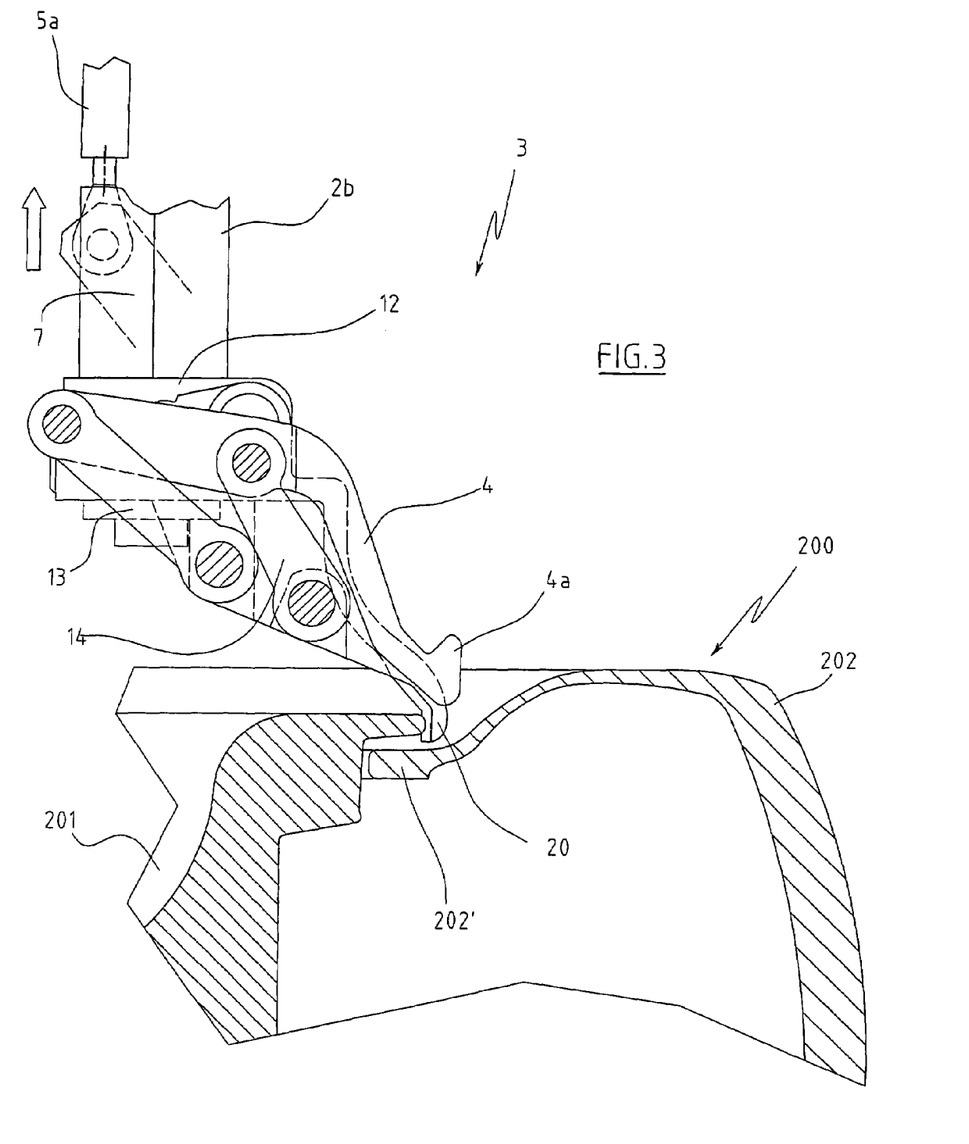
FIGS. 3 and 4 show a section view of FIG. 2, respectively taken along the plane III—III and IV—IV of FIG. 2, in the position for seeking the bead of the tire.
Figure 4:
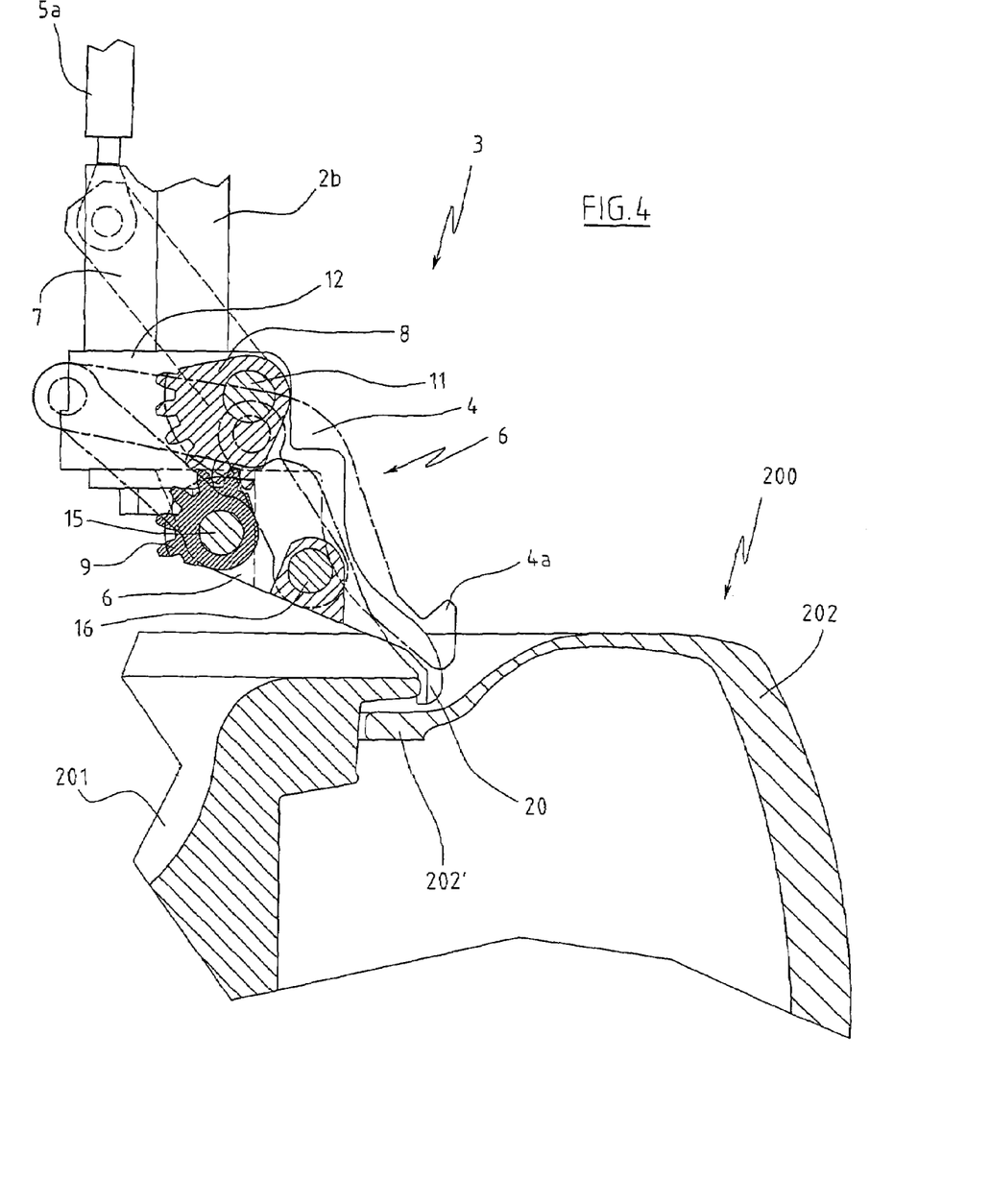
Figure 7:
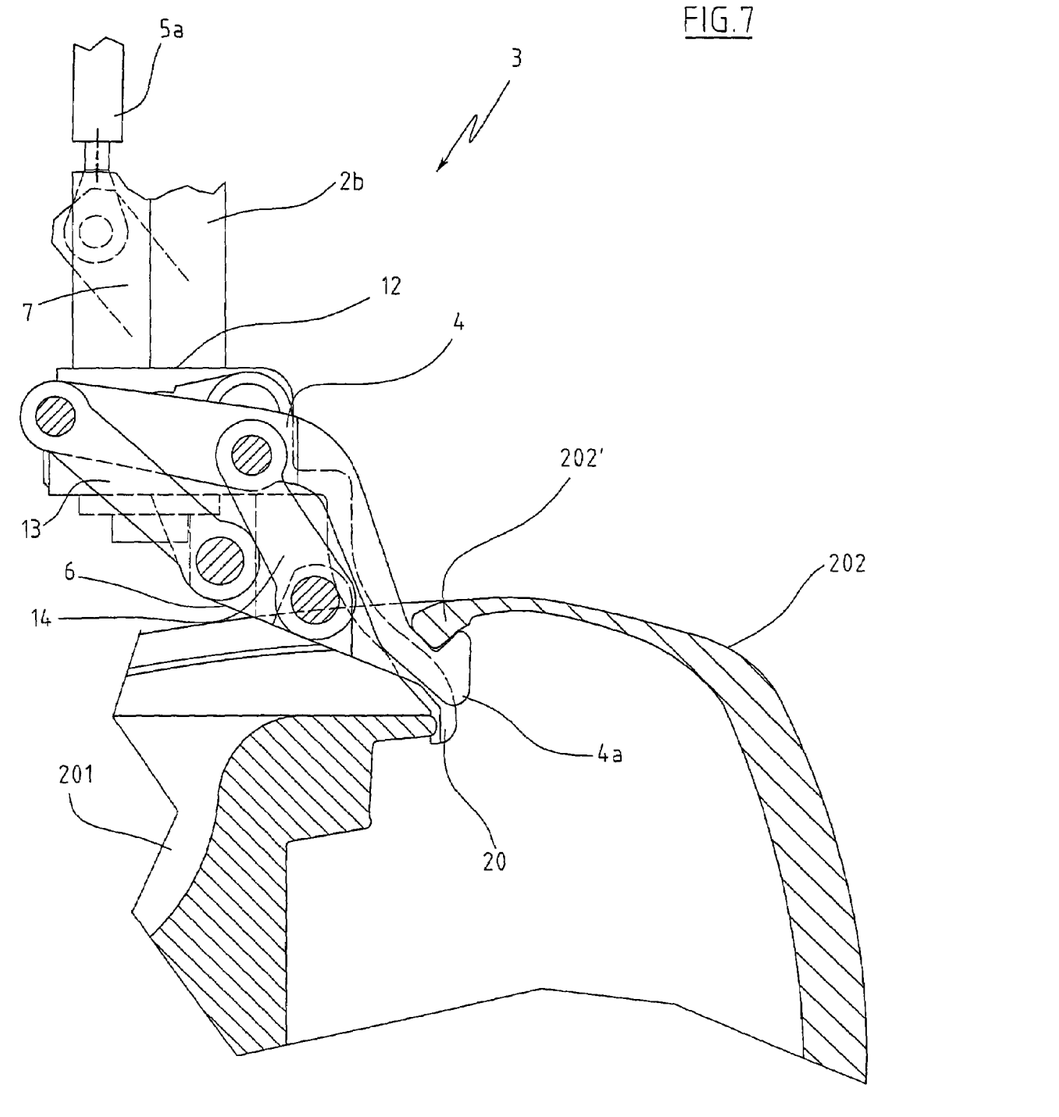

Said articulated system 3 is actuated by a cylinder-piston group 5 that causes a roto-translation of the dismounting tool 4 between a first configuration for seeking and gripping the bead of the tire 202 (FIGS. 3, 4 and 5) and a second configuration for extracting said bead 202' from the rim 201 (FIG. 7).

In the illustrated example said articulated system 3 comprises an articulated quadrilateral made up of the tool 4, the connecting rods 13 and 14 and the body 6 to which the connecting rods 13, 14 are articulated in turn fixed to the lower free end of the mobile shaft 2b, and a manoeuvring lever 7, the function of which shall become clearer later on in the description.

The cylinder-piston group 5 is arranged next to the pipe/mobile shaft group 2, 2b and extends substantially parallel to it.

Said cylinder-piston group 5 cooperates with the articulated quadrilateral through a gear comprising a first toothed wheel sector 8 and a second toothed wheel sector 9 that intermesh, respectively integral with the lever 7 and the connecting rod 13.

The manoeuvring lever 7 has a first end 7' hinged through a first articulation pin 10 to the lower end of the stem 5a of the cylinder-piston group 5 and a second end 7'' fitted on a first rotation shaft 11.

The first rotation shaft 11 is arranged perpendicular to the manoeuvring lever 7 with rotation axis parallel to the rotation axis about the first pin 10 and is inserted, free to rotate in a seat formed in a bushing 12 fixed to the body 6 arranged at the lower end of the mobile shaft 2b.

In accordance with the preferred embodiment of the present invention, the first shaft 11 carries the first toothed wheel sector 8 at the opposite end to the one where the manoeuvring lever 7 is fitted.

In practice, on the first shaft 11, the manoeuvring lever 7 is fitted on one side of the bushing 12 and on the other side of the bushing 12 the first toothed wheel sector 8 is fitted.

When the cylinder-piston group 5 is actuated, the movement of the stem 5a is transmitted to the manoeuvring lever 7 that causes the rotation of the first shaft 11 inserted in the bushing 12, and therefore of the first toothed wheel sector 8.

The first toothed wheel sector 8 meshes with the second toothed wheel sector 9.

The rotation of the second toothed wheel sector 9 causes the rotation of the connecting rod 13.

The connecting rod 13 and the connecting rod 14 are respectively fitted on a second rotation shaft 15 and a third rotation shaft.

Said second and third shaft 15, 16 are arranged parallel to the first shaft 11 and are inserted, free to rotate, in two seats formed in the body 6 that comprises a bead-guide 20, the function of which shall be described later on, associated with the bushing 12 and able to be made in a single piece with it.

The dismounting tool 4 constitutes one of the sides of the articulated quadrilateral and has an appendix 4a forming an angle slightly greater than 90° with the longitudinal axis of the connecting rod itself.

The appendix 4a of the tool 4 is shaped like a hook in order to allow the bead 202' of the tire 202 that is to be dismounted to be hooked.

In virtue of the particular configuration of the articulated system 3, the articulated quadrilateral and the first and second toothed wheel sector 8, 9 lie substantially on a common plane parallel to the plane on which the manoeuvring lever 7 lies, as can be seen in the figures.

Figure 2:
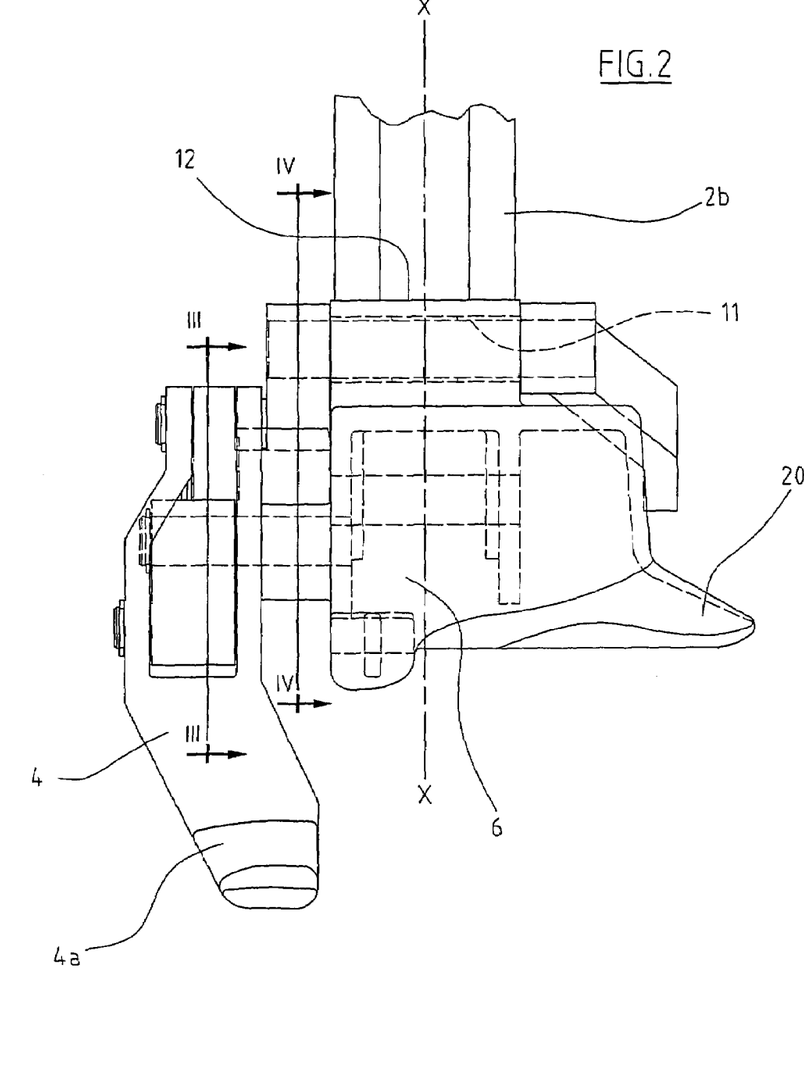
FIG. 2 shows a front view of a detail of the device of FIG. 1.

The bead-guide 20 has the function of easing the positioning of the dismounting tool 4 at the bead 202' of the tire 202 that is to be dismounted, as well as, in virtue of its particular configuration (see FIG. 2), of easing the mounting operation of the tire 202 on the rim 201.

Operatively, with the bead of the tire detached from the bead-locking edge according to the prior art, the wheel 200 is positioned on the support and locking means 102 that allow the rim 201 to be firmly locked and, if actuated by the motor means, allow the wheel 200 to be rotated about the axis Z—Z.

The pipe 2 with the inner mobile shaft 2b is arranged a distance from the post 103 such as to manage to take the tire-dismounting tool 4 onto the vertical of the edge of the rim 201.

With the support arm 104 locked, the mobile shaft 2b is made to slide vertically towards the edge of the rim 201 and is locked when the bead-guide 20 licks the edge of the rim 201 without touching it, to avoid possible damage, even of the elastic type.

Thanks to the device 1 of the present invention, by actuating the cylinder-piston group 5, the stem 5a causes the oscillation of the manoeuvring lever 7 about the axis of the first shaft 11.

The rotation of the lever 7 and of the first toothed wheel sector 8 causes the rotation of the second toothed wheel sector 9 since they are intermeshed.

The rotation of the second toothed wheel sector 9 in turn causes the rotation of the connecting rod 13 integrally associated with it and the consequent deformation of the articulated quadrilateral that transmits the roto-translating motion to the tire-dismounting tool 4, 4a that goes from the seeking configuration (FIGS. 3, 4) to the extraction configuration (FIG. 7) after having gripped the bead 202' of the tire 202.

In practice, when the stem 5a of the cylinder-piston group 5 moves downwards, the first toothed wheel sector 8 rotates anti-clockwise whereas the second toothed wheel sector 9 rotates clockwise.

This causes the penetration of the tire-dismounting tool 4 inside the tire 202 and the hooking of the bead 201' (FIG. 5), laterally passing the edge of the rim 201.

When the stem 5a of the cylinder-piston group 5 reverses its motion upwards, the movements described above similarly occur in reverse.

Figure 5:
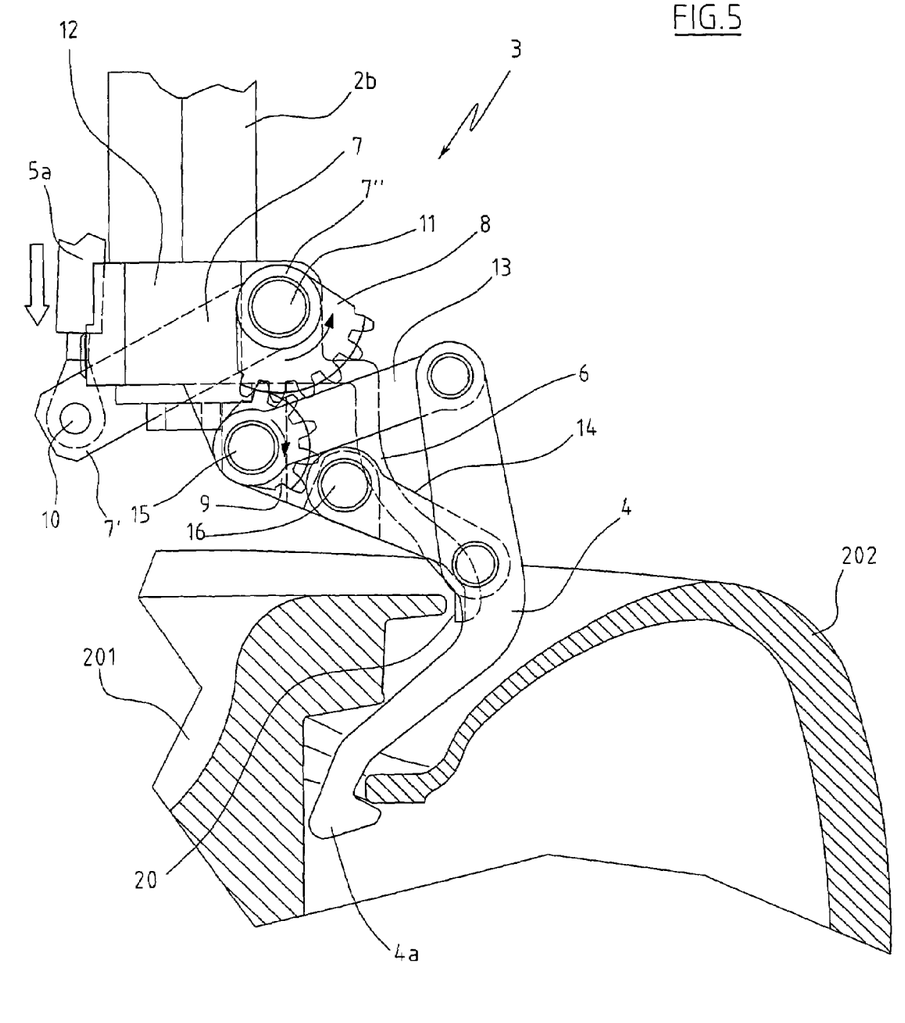
FIGS. 5, 6 and 7 show, in succession, section views of the device of the present invention during the dismounting of a tire.
Figure 6:
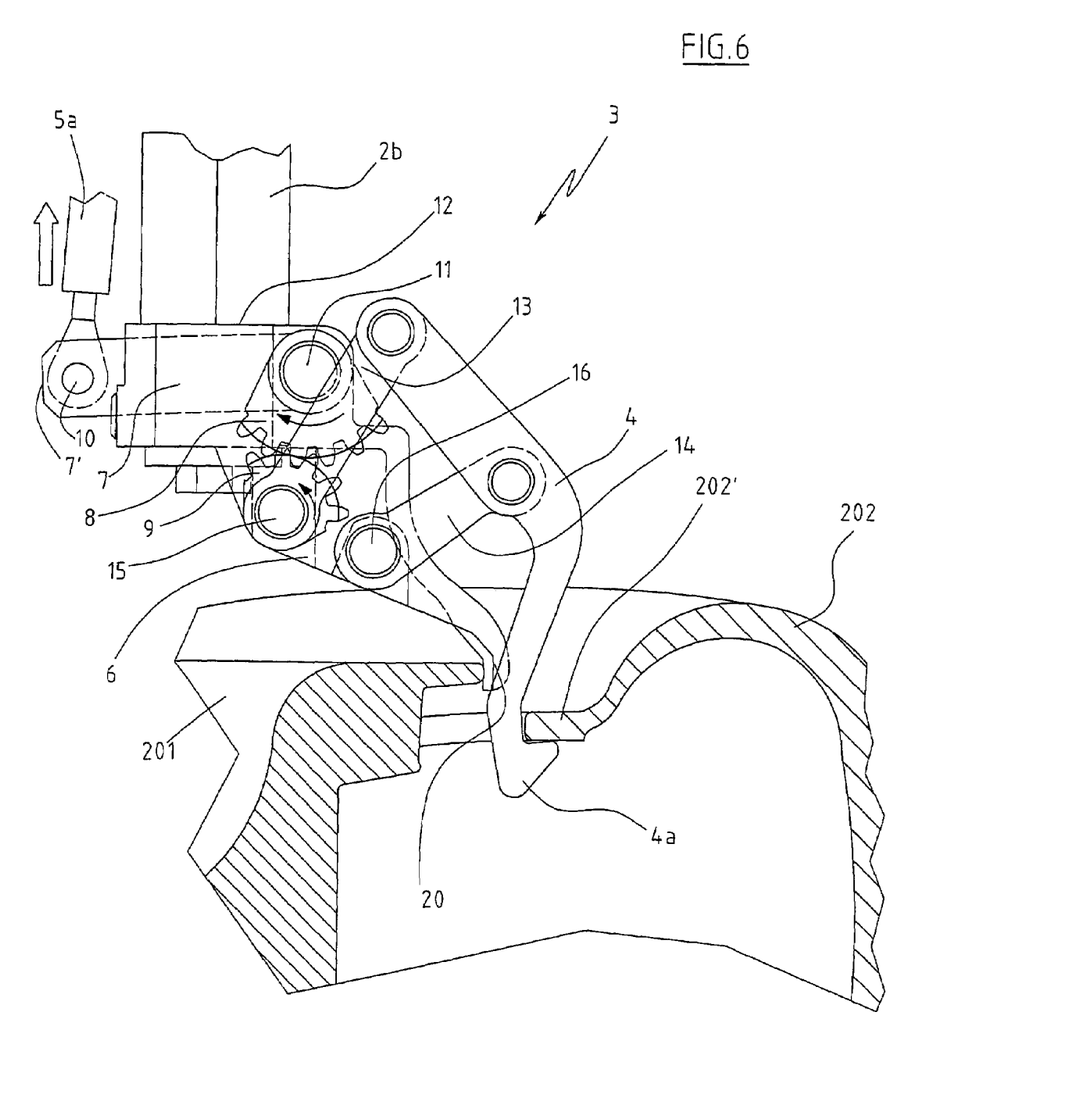

Therefore, it goes from the configuration of FIG. 5 to the configuration of FIG. 6 and finally to the configuration of FIG. 7.

In order to avoid the generation of tension on the tire 202 such as to cause the laceration thereof if excessive, at the end of the extraction of the bead 202' from the rim 201, the hooked appendix 4a of the tool 4 is preferably positioned, together with the bead gripped to it 202', inside the most outer circumference that envelops the rim 201.

To complete the complete extraction of the tire 202 from the rim 201 the support and locking means 102 are actuated as known in the field.

The use of the bead-guide 20 for mounting the tire 202 on the rim 201 is not described hereafter since it is already known in the field.

As can be appreciated from that which has been described, the automatic device for mounting and dismounting tires according to the present invention allows the requirements to be satisfied and the drawbacks mentioned in the introductory part of the present description with reference to the prior art to be overcome.

Indeed, the automatic device for mounting and dismounting tires of the present invention is extremely simple to use as well as effective in the operations carried out, managing to carry out all of the necessary operations for the mounting/dismounting of tires, reducing the actions of the operator to a minimum.

Moreover, said automatic device for mounting and dismounting tires can also be applied to conventional tire-dismounting machines without the need for large modifications.

Of course, a man skilled in the art can bring numerous modifications and variants to the automatic device for mounting and dismounting tires described above in order to satisfy contingent and specific requirements, all of which are covered by the scope of protection of the invention, as defined by the following claims.

The invention claimed is:

1. Automatic device (1) for mounting and dismounting a tire (100) onto/from the rim (201) of a wheel (120) associated with a tire-dismounting machine (100) comprising a lower base (101) on which are associated rotating support and locking means (102) of the rim (201) of a wheel, a pole (103) extending vertically associated with said base (101), a horizontal support arm (104) associated with said pole (103), characterised in that it comprises a mobile shaft (2b) that can slide vertically inside a pipe (2) supported so that it can slide horizontally on said arm (104), an articulated system (3) comprising an articulated quadrilateral made up of a tire-dismounting tool (4), a pair of opposite connecting rods (13, 14) and a body (6) to which said connecting rods (13, 14) are articulated, said body (6) being fixed to the lower end of the mobile shaft (2b), and a manoeuvring lever (7) articulated with said quadrilateral and suitable for deforming it to transmit the roto-translating motion to the tool (4) that goes from a seeking configuration to an extraction configuration of the bead (202') from the rim (201).

2. Device (1) according to claim 1, wherein said manoeuvring lever (7) cooperates in abutment with said articulated quadrilateral through a gear comprising a first toothed wheel sector (8) and a second toothed wheel sector (9) intermeshed with each other.

3. Device (1) according to claim 2, wherein said manoeuvring lever (7) is commanded by a cylinder-piston group (5).

4. Device (1) according to claim 3, wherein said manoeuvring lever (7) has a first end (7') hinged through a first articulation pin (10) to the end of the stem (5a) of said cylinder-piston group (5) and a second end (7") fitted onto a first rotation shaft (11).

5. Device (1) according to claim 4, wherein said first toothed wheel sector (8) is fitted onto said first rotation shaft (11).

6. Device (1) according to claim 2, wherein said connecting rods (13, 14) are respectively fitted onto a second rotation shaft (15) and a third rotation shaft (16).

7. Device (1) according to claim 6, wherein said second toothed wheel sector (9) is fitted onto said second rotation shaft (15).

8. Device (1) according to claim 2, wherein said articulated quadrilateral and said first toothed wheel sector (8) and second toothed wheel sector (9) lie substantially on the same plane, said plane being parallel to the plane on which said manoeuvring lever (7) lies.

9. Device (1) according to claim 1, wherein said tool (4) has a hook-shaped appendix (4a).

10. Device (1) according to claim 1, wherein said body (6) comprises a bead-guide (20).

* * * * *